US012796740B2

(12) United States Patent
Kim et al.

(10) Patent No.: US 12,796,740 B2
(45) Date of Patent: Nov. 17, 2026

(54) AEROSOL GENERATING DEVICE AND SYSTEM

(71) Applicant: KT&G CORPORATION, Daejeon (KR)

(72) Inventors: Dong Sung Kim, Seoul (KR); Yong Hwan Kim, Anyang-si (KR); Hunil Lim, Seoul (KR); Seok Su Jang, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 484 days.

(21) Appl. No.: 18/287,952

(22) PCT Filed: Nov. 17, 2022

(86) PCT No.: PCT/KR2022/018148

§ 371 (c)(1),
(2) Date: Oct. 23, 2023

(87) PCT Pub. No.: WO2023/096262

PCT Pub. Date: Jun. 1, 2023

(65) Prior Publication Data

US 2024/0196984 A1 Jun. 20, 2024

(30) Foreign Application Priority Data

Nov. 23, 2021 (KR) ........................ 10-2021-0162214

(51) Int. Cl.

| | |
|---|---|
| *A24F 47/00* | (2020.01) |
| *A24D 1/20* | (2020.01) |
| *A24F 40/20* | (2020.01) |
| *A24F 40/465* | (2020.01) |
| *A24F 40/51* | (2020.01) |

(Continued)

(52) U.S. Cl.

CPC ................ *A24F 40/51* (2020.01); *A24D 1/20* (2020.01); *A24F 40/20* (2020.01); *A24F 40/465* (2020.01); *A24F 40/53* (2020.01); *H05B 6/108* (2013.01)

(58) Field of Classification Search

CPC ............................... A24F 40/465; A24F 40/51

See application file for complete search history.

(56) References Cited

U.S. PATENT DOCUMENTS

2020/0397035 A1 12/2020 Lee et al.
2021/0106046 A1* 4/2021 Courbat .................. A24F 40/57
2021/0251295 A1 8/2021 Mironov et al.

(Continued)

FOREIGN PATENT DOCUMENTS

CN 113662274 A 11/2021
EP 3 760 063 A1 1/2021

(Continued)

OTHER PUBLICATIONS

CN-113662274-A Translation (Year: 2021).*

(Continued)

*Primary Examiner* — Eric Yaary
(74) *Attorney, Agent, or Firm* — Sughrue Mion, PLLC

(57) ABSTRACT

An aerosol generating device includes a susceptor configured to accommodate at least a portion of an aerosol generating article, and a sensor configured to sense the aerosol generating article and positioned such that the sensor does not overlap the susceptor.

11 Claims, 11 Drawing Sheets

(51) Int. Cl.
*A24F 40/53* (2020.01)
*H05B 6/10* (2006.01)

(56) References Cited

U.S. PATENT DOCUMENTS

| | | | | |
|---|---|---|---|---|
| 2022/0240591 | A1* | 8/2022 | Fursa | A24F 40/465 |
| 2022/0354182 | A1* | 11/2022 | Courbat | A24F 40/50 |
| 2025/0344761 | A1* | 11/2025 | Rothwell | B65B 29/00 |

FOREIGN PATENT DOCUMENTS

| | | | |
|---|---|---|---|
| KR | 10-2019-0014596 | A | 2/2019 |
| KR | 10-2040824 | B1 | 11/2019 |
| KR | 10-2020-0061233 | A | 6/2020 |
| KR | 10-2178421 | B1 | 11/2020 |
| KR | 10-2021-0016770 | A | 2/2021 |
| KR | 10-2231981 | B1 | 3/2021 |
| KR | 10-2021-0077400 | A | 6/2021 |
| WO | 2020/249661 | A1 | 12/2020 |

OTHER PUBLICATIONS

Communication dated Oct. 30, 2023, issued in Korean Application No. 10-2021-0162214.
International Search Report for PCT/KR2022/018148, dated Feb. 24, 2023.
Written Opinion for PCT/KR2022/018148, dated Feb. 24, 2023.
Extended European Search Report dated Dec. 8, 2025, issued in European Application No. 22898944.8.

* cited by examiner

[Fig. 1]
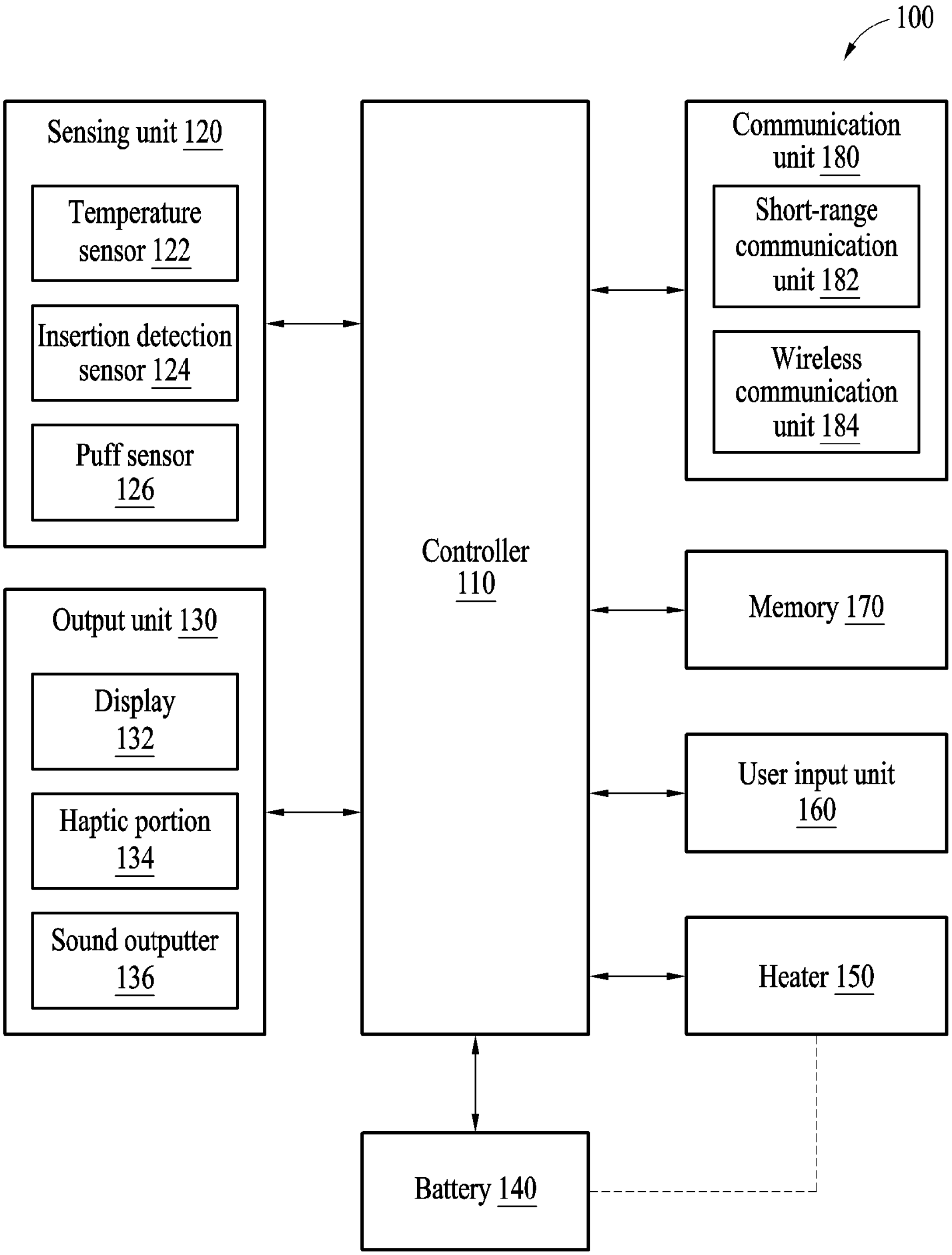

[Fig. 2]
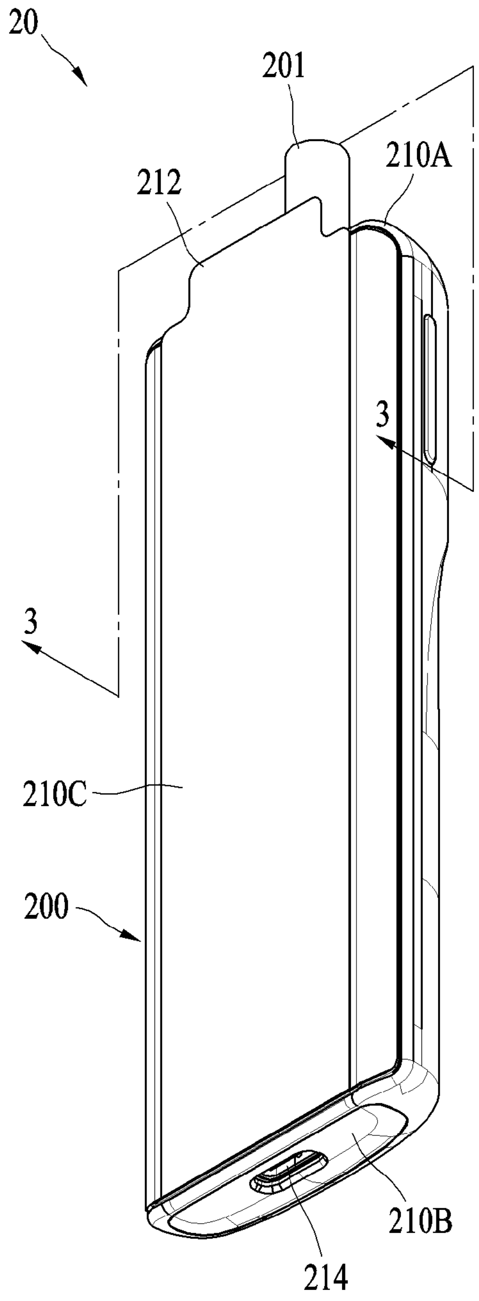

[Fig. 3]
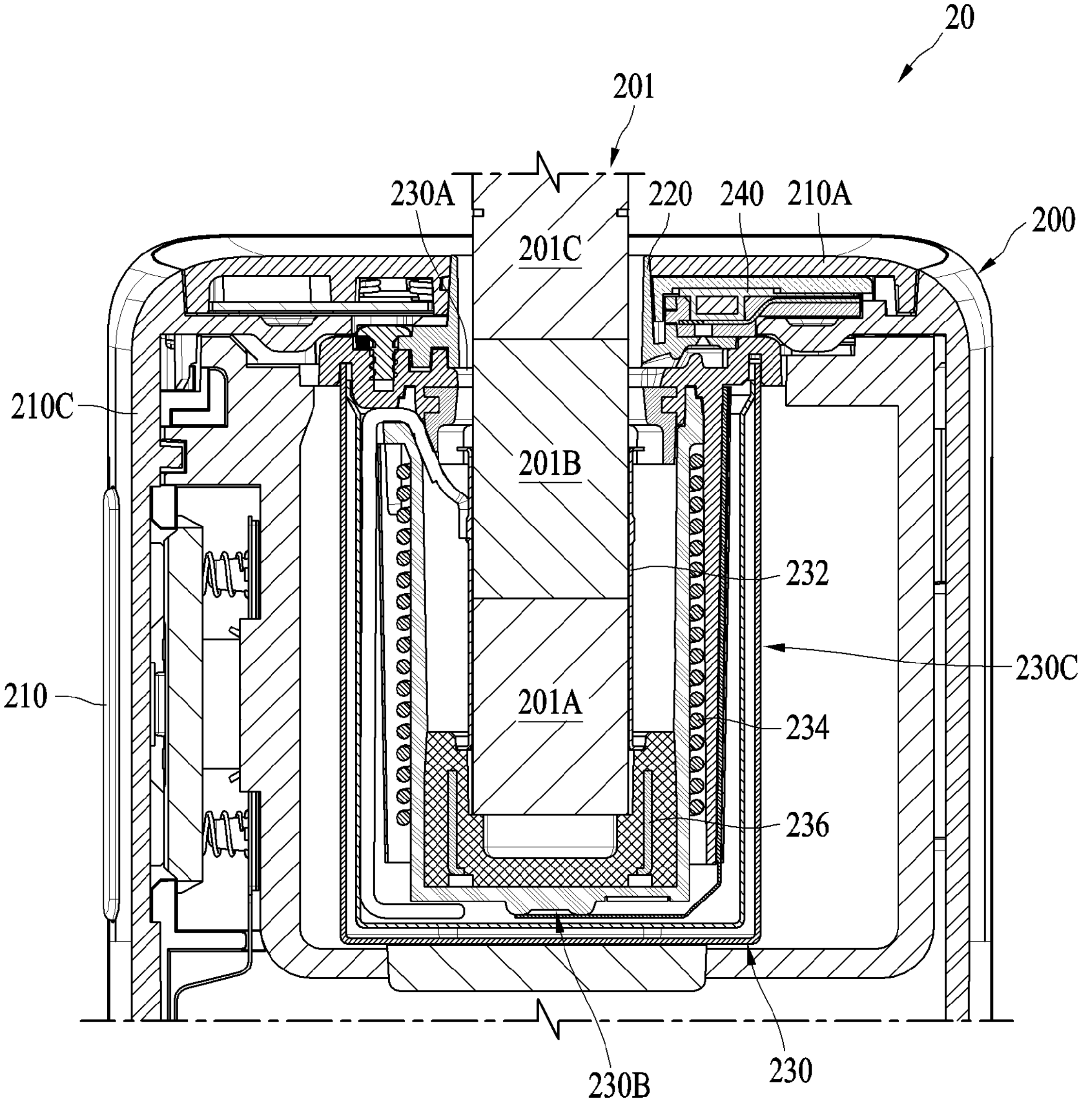

[Fig. 4]
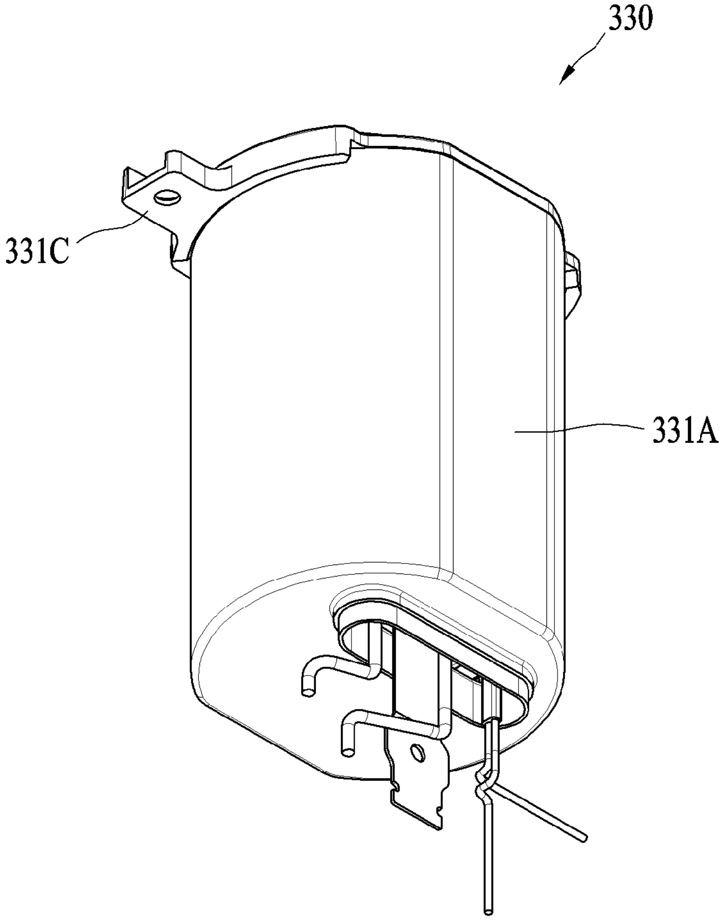

[Fig. 5]
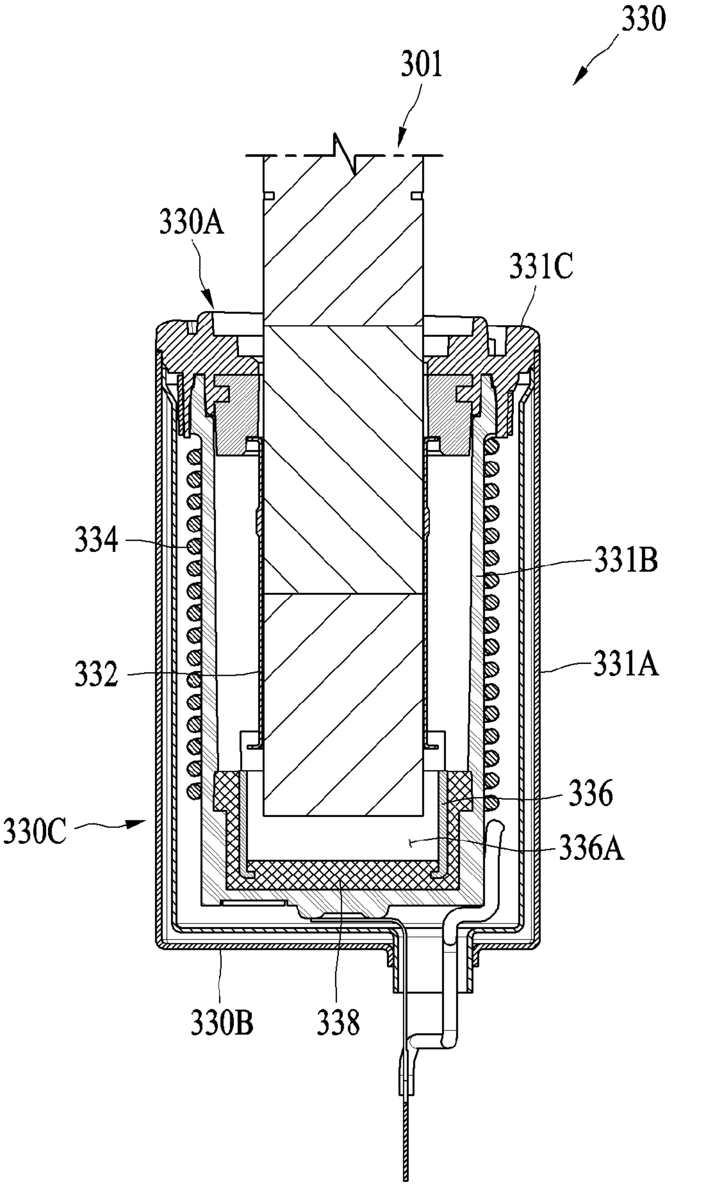

[Fig. 6]
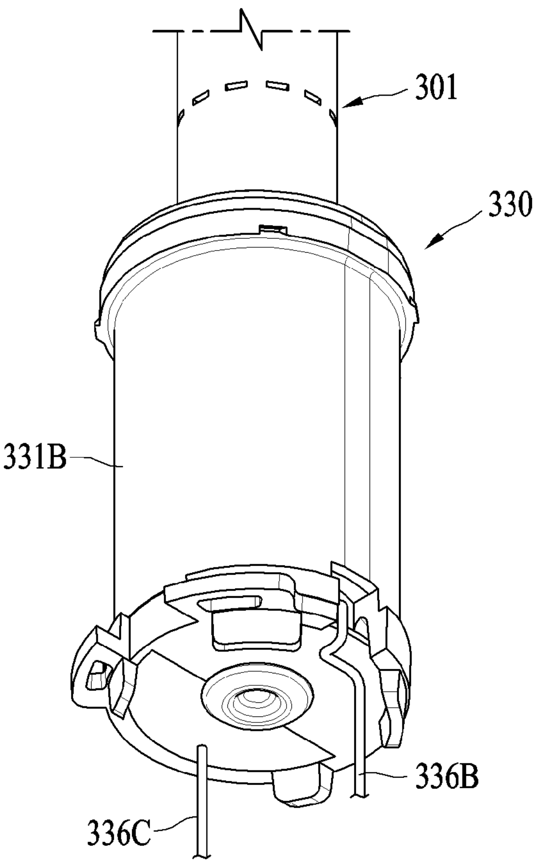

[Fig. 7]
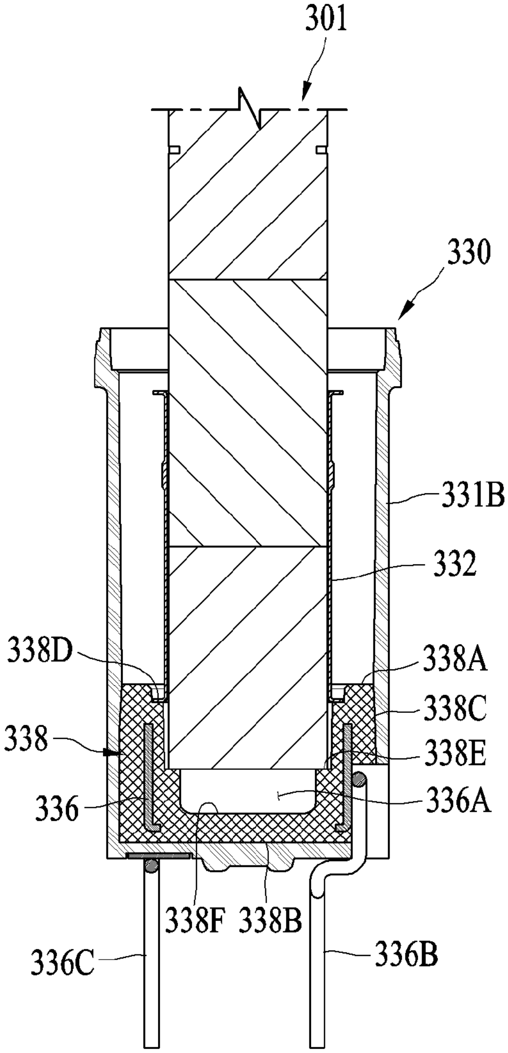

[Fig. 8]
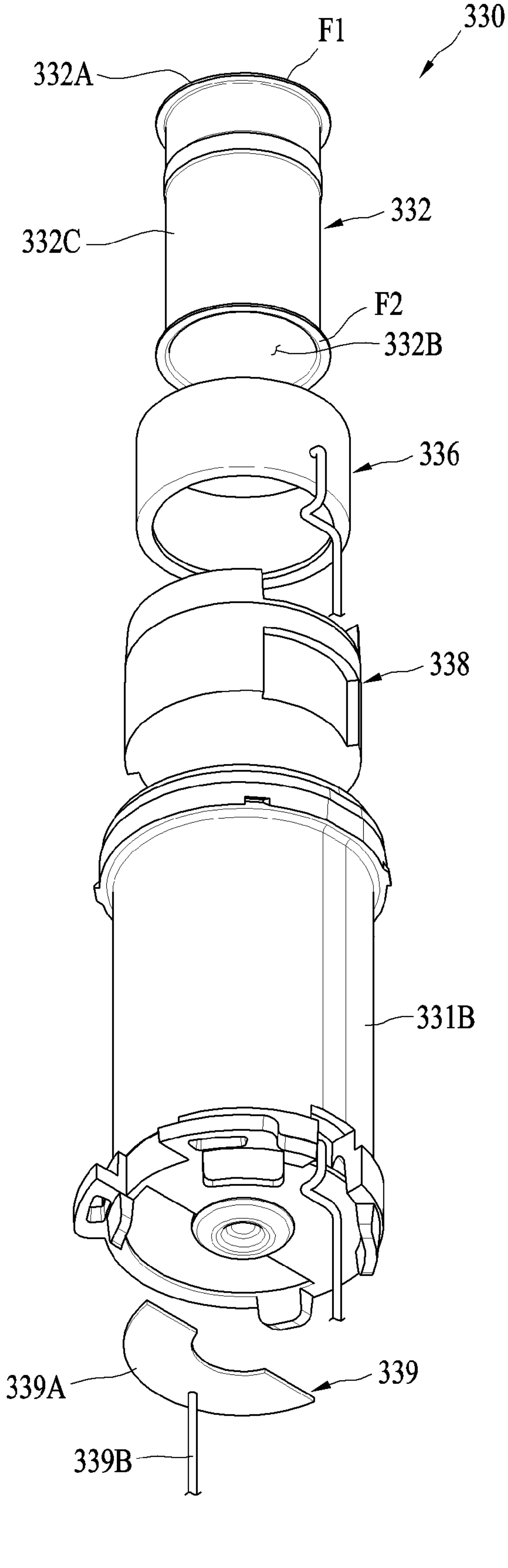

[Fig. 9]
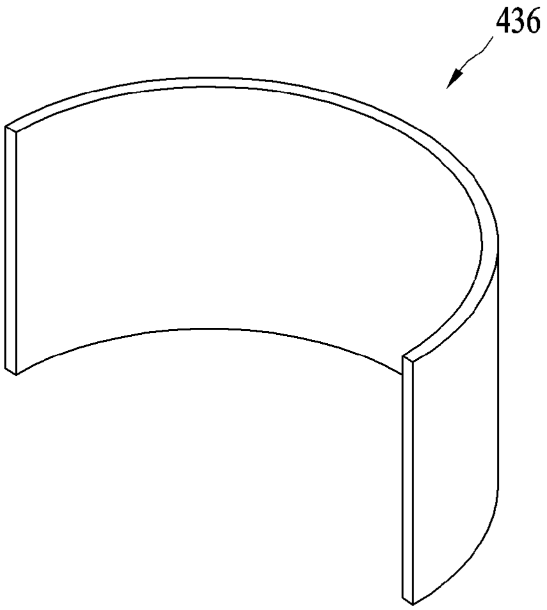
[Fig. 10]
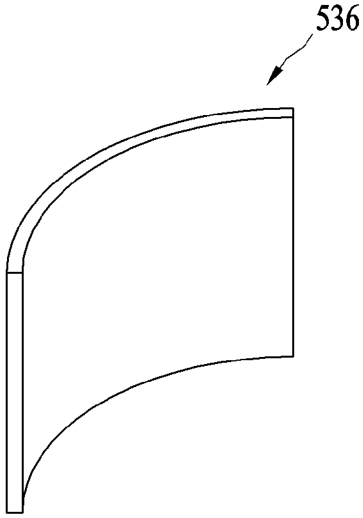
[Fig. 11]
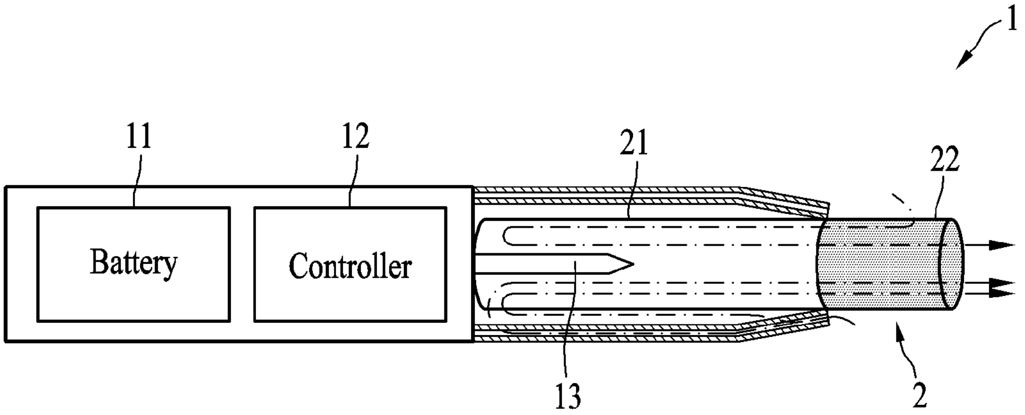

[Fig. 12]
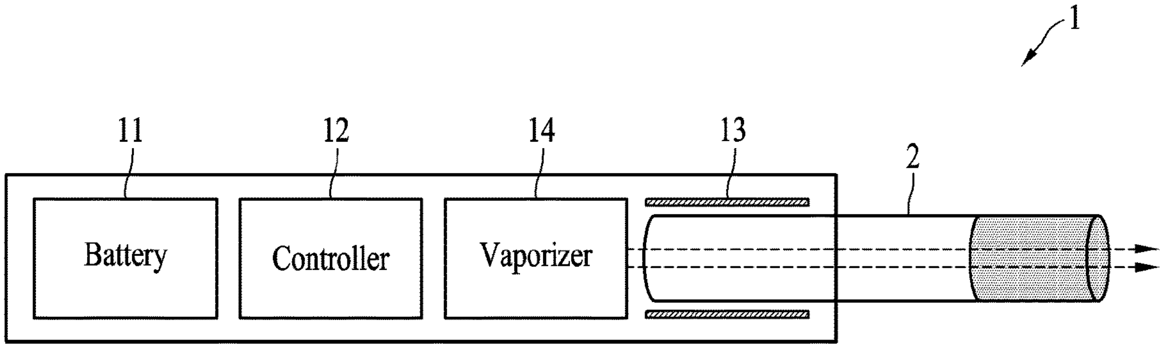
[Fig. 13]
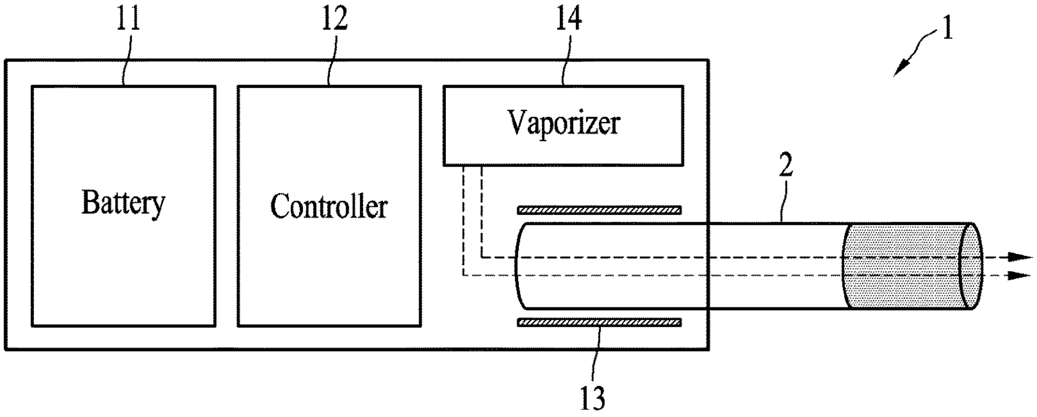
[Fig. 14]
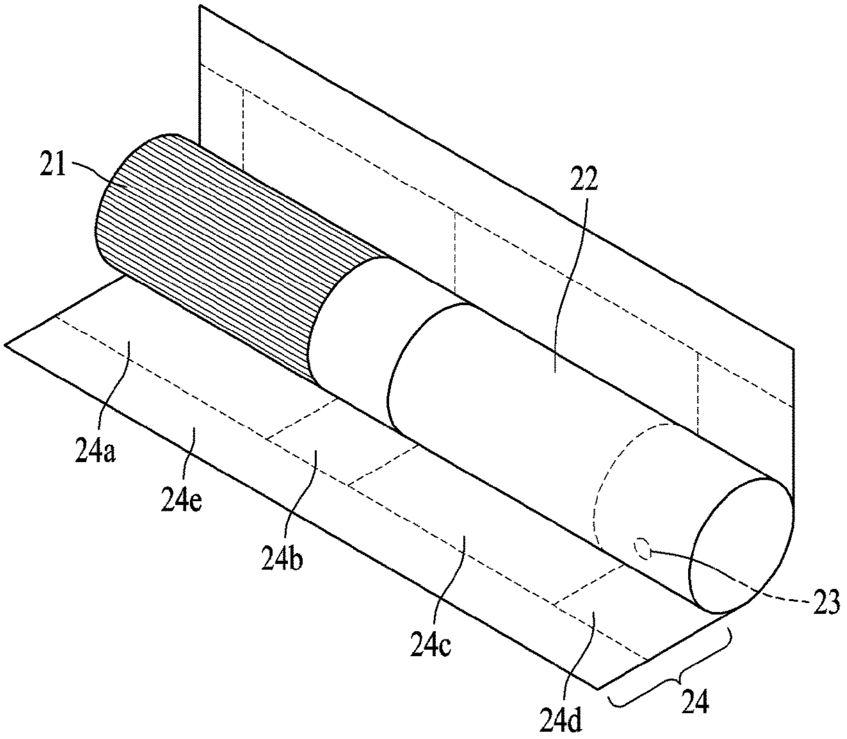

[Fig. 15]
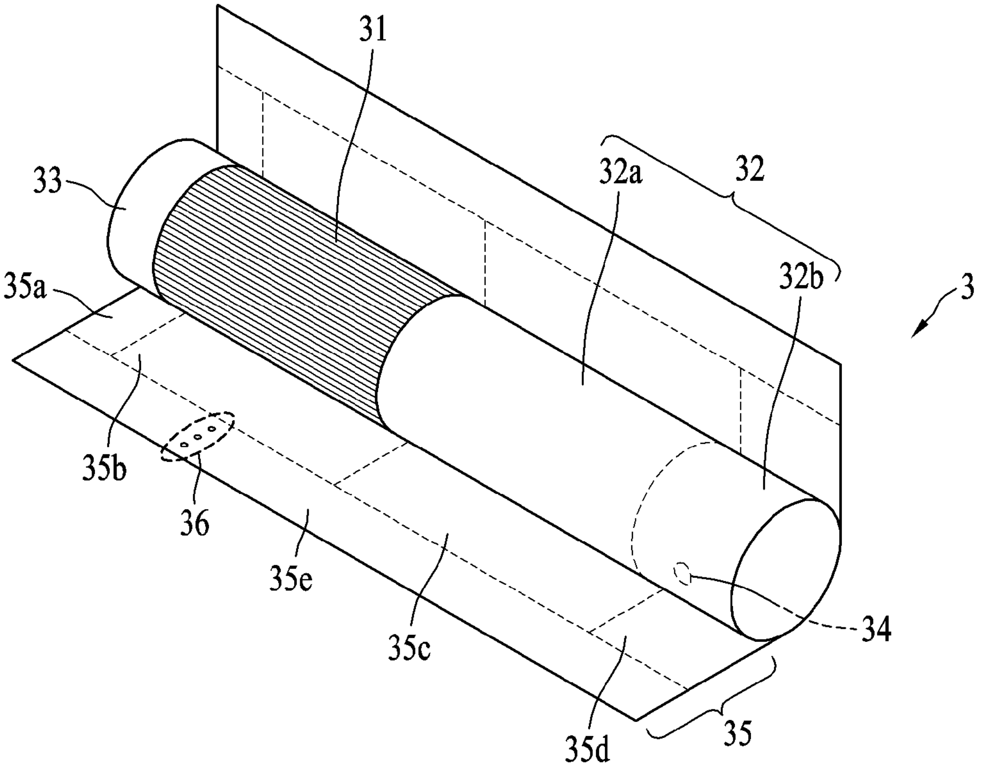

AEROSOL GENERATING DEVICE AND SYSTEM

CROSS REFERENCE TO RELATED APPLICATIONS

This application is a National Stage of International Application No. PCT/KR2022/018148 filed Nov. 17, 2022, claiming priority based on Korean Patent Application No. 10-2021-0162214 filed Nov. 23, 2021.

TECHNICAL FIELD

One or more example embodiments of the disclosure relate to an aerosol generating device and an aerosol generating system.

BACKGROUND ART

Techniques for introducing airflows into an aerosol generating article are being developed to provide atomization performance. For example, aerosol generating devices that generate an aerosol from an aerosol generating article in a non-burning manner are being developed.

DISCLOSURE OF INVENTION

Technical Problem

One aspect of the disclosure may provide an aerosol generating device and an aerosol generating system that provide an environment suitable for an aerosol generating article.

Solution to Problem

According to an aspect, there is provided an aerosol generating device including a susceptor configured to accommodate at least a portion of an aerosol generating article, and a sensor positioned so as not to overlap the susceptor and configured to sense the aerosol generating article.

The aerosol generating device may include a housing, wherein the housing may include a first end portion which is open, a second end portion which is closed and opposite to the first end portion, and a side portion between the first end portion and the second end portion. The susceptor may be positioned adjacent to the first end portion, and the sensor may be positioned adjacent to the second end portion.

The sensor may include an electrode having a side surface, the side surface extending in a circumferential direction.

The electrode may have a substantially circular ring structure.

The electrode may have a substantially semi-circular ring structure.

The electrode may have a substantially quarter-circular ring structure.

The aerosol generating device may further include a ground portion electrically connected to the sensor.

The aerosol generating device may further include a housing, wherein the housing may include a first end portion which is open, a second end portion which is closed and opposite to the first end portion, and a side portion between the first end portion and the second end portion. The ground portion may be positioned on the second end portion of the housing.

The aerosol generating device may further include a housing, wherein the housing may include a first end portion which is open, a second end portion which is closed and opposite to the first end portion, and a side portion between the first end portion and the second end portion. The aerosol generating device may further include a support body positioned on the second end portion of the housing, the support body being configured to support the aerosol generating article and the susceptor, wherein the sensor may be embedded in the support body.

The aerosol generating device may further include a housing, wherein the housing may include a first end portion which is open, a second end portion which is closed and opposite to the first end portion, and a side portion between the first end portion and the second end portion. The susceptor may include a first opening facing the first end portion, a second opening facing the second end portion, and a side wall that provides the first opening and the second opening and positioned between the first opening and the second opening.

According to another aspect, there is provided an aerosol generating system including an aerosol generating article, and an aerosol generating device configured to generate an aerosol from the aerosol generating article, wherein the aerosol generating device comprises a susceptor configured to accommodate at least a portion of the aerosol generating article, and a sensor configured to sense the aerosol generating article and positioned such that the sensor does not overlap the susceptor.

The aerosol generating device may include a housing, wherein the housing may include a first end portion which is open, a second end portion which is closed and opposite to the first end portion, and a side portion between the first end portion and the second end portion. The susceptor may be positioned adjacent to the first end portion, and the sensor may be positioned adjacent to the second end portion.

The sensor may include an electrode having a side surface, the side surface extending in a circumferential direction.

The aerosol generating device may further include a ground portion electrically connected to the sensor.

The aerosol generating article may include a first segment including a moisturizing agent, a second segment including a tobacco medium, and a third segment including a filter.

Advantageous Effects of Invention

According to an example embodiment, it is possible to perform various controls suitable for an aerosol generating article. According to an example embodiment, it is possible to provide a device environment suitable for the type and state of an aerosol generating article. The effects of the aerosol generating device and system according to one example embodiment are not limited to the above-mentioned effects, and other unmentioned effects can be clearly understood from the following description by one of ordinary skill in the art.

BRIEF DESCRIPTION OF DRAWINGS

The foregoing and other aspects, features, and advantages of example embodiments in the disclosure will become apparent from the following detailed description with reference to the accompanying drawings.

FIG. 1 is a block diagram of an aerosol generating device according to an example embodiment.

FIG. 2 is a perspective view of an aerosol generating system according to an example embodiment.

FIG. 3 is a cross-sectional view of the aerosol generating system of FIG. 2 viewed along a line 3-3.

FIG. 4 is a perspective view of a housing of an aerosol generating device according to an example embodiment.

FIG. 5 is a cross-sectional view of the housing of FIG. 4.

FIG. 6 is a perspective view of components in a housing of an aerosol generating device according to an example embodiment.

FIG. 7 is a cross-sectional view of the components in the housing of FIG. 6.

FIG. 8 is an exploded perspective view of a housing of an aerosol generating device according to an example embodiment.

FIG. 9 is a perspective view of a sensor to be included in an aerosol generating device according to an example embodiment.

FIG. 10 is a perspective view of a sensor to be included in an aerosol generating device according to an example embodiment.

FIGS. 11 through 13 are diagrams illustrating examples of an aerosol generating article inserted into an aerosol generating device according to example embodiments.

FIGS. 14 and 15 are diagrams illustrating examples of an aerosol generating article according to example embodiments.

MODE FOR THE INVENTION

The terms used in the example embodiments are selected from among common terms that are currently widely used, in consideration of their function in the example embodiments. However, the terms may become different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

It will be understood that when a certain part "includes" a certain component, the part does not exclude another component but may further include another component, unless the context clearly dictates otherwise. Also, terms such as "unit," "module," etc., as used in the specification may refer to a part for processing at least one function or operation and may be implemented as hardware, software, or a combination of hardware and software.

As used herein, an expression such as "at least one of" that precedes listed components modifies not each of the listed components but all the components. For example, the expression "at least one of a, b, or c" should be construed as including a, b, c, a and b, a and c, b and c, or a, b, and c.

In an example embodiment, an aerosol generating device may be a device that generates an aerosol by electrically heating an aerosol generating article (e.g., a cigarette) accommodated in an inner space.

The aerosol generating device may include a heater. In an example embodiment, the heater may be an electrically resistive heater. For example, the heater may include an electrically conductive track, and the heater may be heated as a current flows through the electrically conductive track.

The heater may include a heating element, which is one of various shapes. For example, the heating element may include a tubular heating element, a plate-shaped heating element, a needle-shaped heating element, or a rod-shaped heating element, and may heat the inside or outside of the cigarette according to the shape of a heating element.

The cigarette may include a tobacco rod and a filter rod. The tobacco rod may be formed as a sheet or a strand, or may be formed of tobacco leaves finely cut from a tobacco sheet. Also, the tobacco rod may be surrounded by a thermally conductive material. For example, the thermally conductive material may be a metal foil such as aluminum foil. However, example embodiments are not limited thereto.

The filter rod may be a cellulose acetate filter. The filter rod may include at least one segment. For example, the filter rod may include a first segment that cools an aerosol and a second segment that filters a predetermined ingredient contained in the aerosol.

In an example embodiment, the aerosol generating device may be a device that generates an aerosol using a cartridge containing an aerosol generating material.

The aerosol generating device may include a cartridge containing the aerosol generating material and a main body supporting the cartridge. The cartridge may be detachably coupled to the main body. However, example embodiments are not limited thereto. The cartridge may be integrally formed or assembled with the main body, and may be secured to the main body so as not to be detached by a user. The cartridge may be mounted on the main body in which the aerosol generating material is accommodated. However, example embodiments are not limited thereto. The aerosol generating material may be injected into the cartridge, which is coupled to the main body.

The cartridge may hold the aerosol generating material having any one of various states, such as a liquid state, a solid state, a gaseous state, and a gel state. The aerosol generating material may include a liquid composition. For example, the liquid composition may be a liquid including a tobacco-containing material having a volatile tobacco flavor ingredient, or a liquid including a non-tobacco material.

The cartridge may be operated by an electrical signal or a wireless signal transmitted from the main body to perform the function of generating an aerosol by converting the phase of the aerosol generating material inside the cartridge to a gaseous phase. The aerosol may refer to a gas in which vaporized particles generated from the aerosol generating material are mixed with air.

In an example embodiment, the aerosol generating device may generate an aerosol by heating the liquid composition, and the generated aerosol may pass through the cigarette and be delivered to the user. That is, the aerosol generated from the liquid composition may travel along airflow paths of the aerosol generating device, and the airflow paths may be configured to allow the aerosol to pass through the cigarette and be delivered to the user.

In an example embodiment, the aerosol generating device may be a device that generates an aerosol from the aerosol generating material using an ultrasonic vibration manner. In this case, the ultrasonic vibration manner may refer to a manner of generating an aerosol by atomizing the aerosol generating material with ultrasonic vibration generated by a vibrator.

The aerosol generating device may include a vibrator, and may generate vibration at short intervals through the vibrator to atomize the aerosol generating material. The vibration generated by the vibrator may be ultrasonic vibration, and the frequency band of the ultrasonic vibration may be from about 100 kHz to about 3.5 MHz. However, example embodiments are not limited thereto.

The aerosol generating device may further include a wick that absorbs the aerosol generating material. For example, the wick may be disposed to surround at least one area of the vibrator or may be disposed to contact at least one area of the vibrator.

As a voltage (e.g., an alternating voltage) is applied to the vibrator, the vibrator may generate heat and/or ultrasonic vibration, and the heat and/or ultrasonic vibration generated by the vibrator may be transmitted to the aerosol generating material absorbed in the wick. The aerosol generating material absorbed in the wick may be converted into a gas phase by the heat and/or ultrasonic vibration transmitted from the vibrator, and consequently, an aerosol may be generated.

For example, the viscosity of the aerosol generating material absorbed in the wick may be lowered by the heat generated by the vibrator, and the aerosol generating material whose viscosity is lowered may change to fine particles by the ultrasonic vibration generated by the vibrator, so that an aerosol may be generated. However, example embodiments are not limited thereto.

In an example embodiment, the aerosol generating device may be a device that generates an aerosol by heating the aerosol generating article accommodated therein in an induction heating manner.

The aerosol generating device may include a susceptor and a coil. In an example embodiment, the coil may apply a magnetic field to the susceptor. As the aerosol generating device supplies power to the coil, a magnetic field may be formed inside the coil. In an example embodiment, the susceptor may include a magnetic body that generates heat by an external magnetic field. As the susceptor is positioned inside the coil and generates heat with the magnetic field applied, the aerosol generating article may be heated. Also, optionally, the susceptor may be positioned in the aerosol generating article.

In an example embodiment, the aerosol generating device may further include a cradle.

The aerosol generating device and the separate cradle may form a system together. For example, the cradle may be used to charge a battery of the aerosol generating device. Alternatively, a heater may be heated when the cradle and the aerosol generating device are coupled to each other.

Hereinafter, example embodiments of the disclosure will be described in detail with reference to the accompanying drawings such that one of ordinary skill in the art may easily practice the disclosure. The disclosure may be practiced in forms that are implementable in the aerosol generating devices according to various example embodiments described above or may be embodied and practiced in many different forms and is not limited to the example embodiments described herein.

Hereinafter, example embodiments of the disclosure will be described in detail with reference to the drawings.

FIG. 1 is a block diagram of an aerosol generating device according to an example embodiment. Referring to FIG. 1, an aerosol generating device 100 may include a controller 110, a sensing unit 120, an output unit 130, a battery 140, a heater 150, a user input unit 160, a memory 170, and a communication unit 180. However, the internal structure of the aerosol generating device 100 is not limited to what is shown in FIG. 1. It is to be understood by one of ordinary skill in the art to which the disclosure pertains that some of the components shown in FIG. 1 may be omitted or modified or new components may be added according to the design of the aerosol generating device 100.

The sensing unit 120 may sense a state of the aerosol generating device 100 or a state of an environment around the aerosol generating device 100, and transmit sensing information obtained through the sensing to the controller 110. Based on the sensing information, the controller 110 may control the aerosol generating device 100 to control operations of the heater 150, restrict smoking, determine whether an aerosol generating article (e.g., a cigarette, a cartridge, etc.) is inserted, display a notification, and/or perform other functions.

The sensing unit 120 may include at least one of a temperature sensor 122, an insertion detection sensor 124, or a puff sensor 126. However, example embodiments are not limited thereto.

The temperature sensor 122 may sense a temperature at which the heater 150 (or an aerosol generating material) is heated. The aerosol generating device 100 may include a separate temperature sensor for sensing the temperature of the heater 150, or the heater 150 itself may perform a function as a temperature sensor. Alternatively, the temperature sensor 122 may be arranged around the battery 140 to monitor the temperature of the battery 140.

The insertion detection sensor 124 may sense whether the aerosol generating article is inserted or removed. The insertion detection sensor 124 may include, for example, at least one of a film sensor, a pressure sensor, a light sensor, a resistive sensor, a capacitive sensor, an inductive sensor, or an infrared sensor, which may sense a signal change by the insertion or removal of the aerosol generating article.

The puff sensor 126 may sense a puff from a user based on various physical changes in an airflow path or airflow channel. For example, the puff sensor 126 may sense the puff of the user based on any one of a temperature change, a flow change, a voltage change, and a pressure change.

The sensing unit 120 may further include at least one of a temperature/humidity sensor, an atmospheric pressure sensor, a magnetic sensor, an acceleration sensor, a gyroscope sensor, a position sensor (e.g., a global positioning system (GPS)), a proximity sensor, or a red, green, blue (RGB) sensor (e.g., an illuminance sensor), in addition to the sensors 122 through 126 described above. A function of each sensor may be intuitively inferable from its name by one of ordinary skill in the art, and thus, a more detailed description thereof will be omitted here.

The output unit 130 may output information about the state of the aerosol generating device 100 and provide the information to the user. The output unit 130 may include at least one of a display 132, a haptic portion 134, or a sound outputter 136. However, example embodiments are not limited thereto. When the display 132 and a touchpad are provided in a layered structure to form a touchscreen, the display 132 may be used as an input device in addition to an output device.

The display 132 may visually provide information about the aerosol generating device 100 to the user. The information about the aerosol generating device 100 may include, for example, a charging/discharging state of the battery 140 of the aerosol generating device 100, a preheating state of the heater 150, an insertion/removal state of the aerosol generating article, a limited usage state (e.g., an abnormal article detected) of the aerosol generating device 100, or the like, and the display 132 may externally output the information. The display 132 may be, for example, a liquid-crystal display panel (LCD), an organic light-emitting display panel (OLED), or the like. The display 132 may also be in the form of a light-emitting diode (LED) device.

The haptic portion 134 may provide information about the aerosol generating device 100 to the user in a haptic way by converting an electrical signal into a mechanical stimulus or an electrical stimulus. The haptic portion 134 may include, for example, a motor, a piezoelectric element, or an electrical stimulation device.

The sound outputter 136 may provide information about the aerosol generating device 100 to the user in an auditory way. For example, the sound outputter 136 may convert an electrical signal into a sound signal and externally output the sound signal.

The battery 140 may supply power to be used to operate the aerosol generating device 100. The battery 140 may supply power to heat the heater 150. In addition, the battery 140 may supply power required for operations of the other components (e.g., the sensing unit 120, the output unit 130, the user input unit 160, the memory 170, and the communication unit 180) included in the aerosol generating device 100. The battery 140 may be a rechargeable battery or a disposable battery. The battery 140 may be, for example, a lithium polymer (LiPoly) battery. However, example embodiments are not limited thereto.

The heater 150 may receive power from the battery 140 to heat the aerosol generating material. Although not shown in FIG. 1, the aerosol generating device 100 may further include a power conversion circuit (e.g., a direct current (DC)-to-DC (DC/DC) converter) that converts power of the battery 140 and supplies the power to the heater 150. In addition, when the aerosol generating device 100 generates an aerosol in an induction heating manner, the aerosol generating device 100 may further include a DC-to-alternating current (AC) (DC/AC) converter that converts DC power of the battery 140 into AC power.

The controller 110, the sensing unit 120, the output unit 130, the user input unit 160, the memory 170, and the communication unit 180 may receive power from the battery 140 to perform functions. Although not shown in FIG. 1, the aerosol generating device 100 may further include a power conversion circuit, for example, a low dropout (LDO) circuit or a voltage regulator circuit, which converts power of the battery 140 and supplies the power to respective components.

According to an example embodiment, the heater 150 may include a predetermined electrically resistive material that is suitable for heating. The electrically resistive material may include a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, example embodiments are not limited thereto. In addition, the heater 150 may be implemented as a metal heating wire, a metal heating plate on which an electrically conductive track is arranged, a ceramic heating element, or the like. However, example embodiments are not limited thereto.

According to an example embodiment, the heater 150 may be an induction heater. For example, the heater 150 may include a susceptor that heats the aerosol generating material by generating heat through a magnetic field applied by a coil.

The user input unit 160 may receive information input from the user and/or may output information to the user. For example, the user input unit 160 may include a keypad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like. However, example embodiments are not limited thereto. In addition, although not shown in FIG. 1, the aerosol generating device 100 may further include a connection interface such as a universal serial bus (USB) interface, and may be connected to another external device through the connection interface such as a USB interface to transmit and receive information or to charge the battery 140.

The memory 170, which is hardware for storing various pieces of data processed in the aerosol generating device 100, may store data processed by the controller 110 and data to be processed thereby. The memory 170 may include at least one type of storage medium of a flash memory type memory, a hard disk type memory, a multimedia card micro type memory, a card type memory (e.g., an SD or XE memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The memory 170 may store various information related to operations of the aerosol generating device such as, for example but not limited to, an operating time of the aerosol generating device 100, a maximum number of puffs, a current number of puffs, at least one temperature profile, data associated with a smoking pattern of the user, or the like.

The communication unit 180 may include at least one component for communicating with another electronic device. For example, the communication unit 180 may include a short-range communication unit 182 and a wireless communication unit 184.

The short-range wireless communication unit 182 may include a Bluetooth communication unit, a BLE communication unit, a near field communication unit, a WLAN (Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit. However, example embodiments are not limited thereto.

The wireless communication unit 184 may include, for example, a cellular network communicator, an Internet communicator, a computer network (e.g., a local area network (LAN) or a wide-area network (WAN)) communicator, or the like. However, example embodiments are not limited thereto. The wireless communication unit 184 may use subscriber information (e.g., international mobile subscriber identity (IMSI)) to identify and authenticate the aerosol generating device 100 in a communication network.

The controller 110 may control the overall operation of the aerosol generating device 100. In an example embodiment, the controller 110 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that it may be implemented in other types of hardware.

The controller 110 may control the temperature of the heater 150 by controlling the supply of power from the battery 140 to the heater 150. For example, the controller 110 may control the supply of power by controlling the switching of a switching element between the battery 140 and the heater 150. In another example, a direct heating circuit may control the supply of power to the heater 150 according to a control command from the controller 110.

The controller 110 may analyze a sensing result obtained by the sensing of the sensing unit 120 and control processes to be performed thereafter. For example, the controller 110 may control power to be supplied to the heater 150 to start or end an operation of the heater 150 based on the sensing result obtained by the sensing unit 120. As another example, the controller 110 may control an amount of power to be supplied to the heater 150 and a time for which the power is to be supplied, such that the heater 150 may be heated up to a predetermined temperature or maintained at a desired temperature, based on the sensing result obtained by the sensing unit 120.

The controller 110 may control the output unit 130 based on the sensing result obtained by the sensing unit 120. For example, when the number of puffs counted through the puff sensor 126 reaches a preset number, the controller 110 may inform the user that the aerosol generating device 100 is to be ended soon, through at least one of the display 132, the haptic portion 134, or the sound outputter 136.

According to an example embodiment, the controller 110 may control a power supply time and/or a power supply amount for the heater 150 according to a state of the aerosol generating article sensed by the sensing unit 120. For example, when the aerosol generating article (e.g., an aerosol generating article 201) is in an over-humidified state, the controller 110 may control the power supply time for an inductive coil to increase a preheating time, compared to a case where the aerosol generating article (e.g., the aerosol generating article 201) is in a general state.

FIG. 2 is a perspective view of an aerosol generating system according to an example embodiment, and FIG. 3 is a cross-sectional view of the aerosol generating system of FIG. 2 viewed along a line 3-3. Referring to FIGS. 2 and 3, an aerosol generating system 20 may include an aerosol generating device 200 and an aerosol generating article 201. The aerosol generating device 200 may accommodate the aerosol generating article 201 in an inner space and electrically heat the aerosol generating article 201 to generate an aerosol.

In an example embodiment, the aerosol generating article 201 may include a plurality of segments 201A, 201B, and 201C having different materials. For example, the aerosol generating article 201 may include a first segment 201A, a second segment 201B, and a third segment 201C sequentially in the flow stream direction of air. In some example embodiments, a portion of the third segment 201C may be positioned between the first segment 201A and the second segment 201B.

In an example embodiment, the first segment 201A may include a moisturizing agent. The moisturizing agent may include glycerin, propylene glycol (PG), and water. In some example embodiments, the moisturizing agent may include at least one of glycerin, propylene glycol, ethylene glycol, dipropylene glycol, diethylene glycol, triethylene glycol, tetraethylene glycol, or oleyl alcohol. In some example embodiments, the first segment 201A may include nicotine.

In an example embodiment, the second segment 201B may include a tobacco medium. The tobacco medium may include solid materials based on tobacco sheets, cut tobacco leaves, and/or reconstituted tobacco raw materials. In an example embodiment, the second segment 201B may be filled with corrugated tobacco sheets. The tobacco sheets may be corrugated by being rolled, folded, compressed, or contracted substantially in a direction transverse to a cylindrical axis. In an example embodiment, the second segment 201B may be filled with cut tobacco leaves. The cut tobacco leaves may be produced by chopping a tobacco sheet (or a slurry tobacco sheet). In addition, the second segment 201B may be formed by combining a plurality of tobacco strands in the same direction (e.g., in parallel) or at random. In an embodiment, the second segment 201B may be formed by combining a plurality of tobacco strands, and may include a plurality of longitudinal channels through which an aerosol may pass. The longitudinal channels may be uniform or non-uniform according to the size and arrangement of the tobacco strands.

In an example embodiment, the tobacco medium may include at least one of ethylene glycol, dipropylene glycol, diethylene glycol, triethylene glycol, tetraethylene glycol and oleyl alcohol. In some example embodiments, the tobacco medium may include glycerin and propylene glycol.

In an example embodiment, the second segment 201B may include other additives such as a flavoring agent and/or an organic acid. For example, the flavoring agent may include licorice, sucrose, fructose syrup, isosweet, cocoa, lavender, cinnamon, cardamom, celery, fenugreek, cascarilla, sandalwood, bergamot, geranium, honey essence, rose oil, vanilla, lemon oil, orange oil, mint oil, cinnamon, caraway, cognac, jasmine, chamomile, menthol, ylang-ylang, sage, spearmint, ginger, coriander, and/or coffee.

In some example embodiments, at least a portion of the second segment 201B may include glycerin or propylene glycol.

In an example embodiment, the third segment 201C may include a filter. The filter may include at least one of a tubular filter, a cooling structure, or a recessed filter. For example, the tubular filter may have a shape including a hollow portion therein. The tubular filter and/or the recessed filter may be formed of a cellulose-based material (e.g., paper, acetate, etc.). The cooling structure may be formed of pure polylactic acid or formed by combining polylactic acid with another degradable polymer.

In an example embodiment, the aerosol generating article 201 may include a wrapper (not shown) for wrapping at least a portion of the first segment 201A, the second segment 201B, and/or the third segment 201C with. In some example embodiments, the aerosol generating article 201 may include a waterproof, water(oil)-repellent, and heat-resistant material (e.g., aluminum foil) for surrounding at least a portion of the first segment 201A, the second segment 201B, and/or the third segment 201C with. For example, the material may be positioned between the wrapper and the first segment 201A.

The aerosol generating device 200 may include a first housing 210 configured to accommodate at least a portion of the aerosol generating article 201 and accommodate various electronic/mechanical components. The first housing 210 may include, for example, a first surface 210A (e.g., a front surface), a second surface 210B (e.g., a rear surface) opposite to the first surface 210A, and at least one third surface 210C (e.g., at least one side surface) between the first surface 210A and the second surface 210B.

In an example embodiment, the first housing 210 may include a flap 212 configured to cover at least a portion of the first surface 210A and open or close a path (e.g., an article insertion portion 220) along which the aerosol generating article 201 is inserted to or removed from the aerosol generating device 200. For example, the flap 212 may be rotatably connected to the third surface 210C.

In an example embodiment, the first housing 210 may include an opening/closing mechanism configured to open or close the path (e.g., the article insertion portion 220) along which the aerosol generating article 201 is inserted into or removed from the aerosol generating device 200. The opening/closing mechanism may include, for example, a guide slot (not shown) formed in the vicinity of the article insertion portion 220 and on the first surface 210A and a door (not shown) configured to open or close the article insertion portion 220 along the guide slot. In some example embodiments, the door and the guide slot may be covered by the flap 212.

In an example embodiment, the first housing 210 may include a connecting terminal 214 formed on the second surface 210B. The connecting terminal 214 may include a connector configured to physically connect the aerosol generating device 200 to an external device through the connecting terminal 214. The connecting terminal 214 may include, for example, a high-definition multimedia interface (HDMI) connector, a USB connector, a secure digital (SD) card connector, or an audio connector (e.g., a headphone connector).

The aerosol generating device 200 may include the article insertion portion 220 including an insertion space that the aerosol generating article 201 is inserted into and removed from. In an example embodiment, the article insertion portion 220 may include a plurality of fixing portions configured to fix the aerosol generating article 201 and a plurality of insertion portion airflow paths formed between the plurality of fixing portions. In an example embodiment, the insertion portion airflow paths may introduce air into the first housing 210 (e.g., into a second housing 230 in the first housing 210) only through the insertion portion airflow paths. The first housing 210 may be hermetic to prevent the occurrence of airflows between the outside and the inside of the first housing 210 in portions other than the insertion portion airflow paths.

The aerosol generating device 200 may include the second housing 230 configured to accommodate at least a portion of the aerosol generating article 201 and heat the aerosol generating article 201. The second housing 230 may be positioned in the first housing 210. The second housing 230 may include an airflow path in fluid connection with the article insertion portion 220. The second housing 230 may include a first end portion 230A (e.g., an upper end portion) adjacent to the first surface 210A and open to be in fluid communication with an airflow path of the article insertion portion 220, a second end portion 230B, which is closed, opposite to the first end portion 230A, and a side portion 230C between the first end portion 230A and the second end portion 230B.

In an example embodiment, the second housing 230 may include a susceptor 232 configured to accommodate at least a portion of the aerosol generating article 201 and support one side (e.g., a side surface) of the aerosol generating article 201. In an example embodiment, the susceptor 232 may support at least a portion of the first segment 201A and at least a portion of the second segment 201B, of the aerosol generating article 201. In an example embodiment, the susceptor 232 may be included in a component other than the second housing 230 (e.g., the first housing 210 or the aerosol generating article 201).

In an example embodiment, the second housing 230 may include a heater 234 configured to heat the aerosol generating article 201. In an example embodiment, the heater 234 may include a coil configured to be magnetically coupled with the susceptor 232. In an example embodiment, at least a portion of the coil may be positioned between the first end portion 230A and the second end portion 230B of the second housing 230. In an example embodiment, when viewed in the radial direction of the second housing 230, the coil may overlap at least a portion of the susceptor 232. In an example embodiment, the heater 234 may be positioned outside the susceptor 232.

In an example embodiment, the second housing 230 may include a sensor 236 (e.g., the insertion detection sensor 124 of FIG. 1 or a capacitive sensor) configured to sense the aerosol generating article 201 inserted to the second housing 230. The sensor 236 may sense the aerosol generating article 201 by detecting a difference between the permittivity when the aerosol generating article 201 is not positioned in the second housing 230 and the permittivity when the aerosol generating article 201 is positioned in the second housing 230 (e.g., a change in the permittivity). In some example embodiments, the sensor 236 may be configured to detect the permittivity of the first segment 201A of the aerosol generating article 201. By using the sensor 236 configured to detect the permittivity of the aerosol generating article 201, the aerosol generating device 200 may control various parameters (e.g., a temperature profile) of the aerosol generating article 201 to be suitable for the aerosol generating article 201, and may provide a device environment suitable for the type and/or state of the aerosol generating article 201.

In an example embodiment, the sensor 236 may be positioned in the second housing 230 so as not to substantially overlap the susceptor 232. For example, the susceptor 232 may be positioned adjacent to the first end portion 230A of the second housing 230, while the sensor 236 may be positioned adjacent to the second end portion 230B of the second housing 230. In some example embodiments, the sensor 236 may be positioned on the second end portion 230B of the second housing 230. The non-overlapping arrangement of the susceptor 232 and the sensor 236 may not substantially hinder the interaction between the susceptor 232 and the heater 234. In an example embodiment, the sensor 236 may be positioned inside the heater 234.

In some example embodiments, the sensor 236 may be positioned in the second housing 230 so as not to substantially overlap the heater 234. For example, the coil of the heater 234 may not extend to the second end portion 230B along the side portion 230C of the second housing 230 so as not to substantially overlap the sensor 236, when viewed in the radial direction of the second housing 230.

The aerosol generating device 200 may include a pressure sensor 240 configured to sense the pressure of airflows between the article insertion portion 220 and the second housing 230. For example, the pressure sensor 240 may sense a change in the pressure of airflows according to a change in the speed of airflows when the airflows are introduced through the article insertion portion 220. In an example embodiment, the pressure sensor 240 may be positioned on a flow stream between the article insertion portion 220 and the second housing 230 and in the first housing 210. In some example embodiments, the pressure sensor 240 may be positioned adjacent to the first face 210A. In some example embodiments, the aerosol generating device 200 may include a plurality of pressure sensors 240.

FIGS. 4 through 8 are various views illustrating a housing of an aerosol generating device according to example embodiments.

Referring to FIGS. 4 through 8, a housing 330 (e.g., the second housing 230) may include a first enclosure 331A (e.g., an outer enclosure) that forms an outer shape of the housing 330, a second enclosure 331B (e.g., an inner enclosure) positioned inside the first enclosure 331A, and a third enclosure 331C (e.g., a cover enclosure) that couples the first enclosure 331A and the second enclosure 331B. The first enclosure 331A may define a second end portion 330B (e.g., the second end portion 230B), which is closed, and a side portion 330C (e.g., the side portion 230C). The third enclosure 331C may be positioned on one side of the first enclosure 331A and one side of the second enclosure 331B, and may define a first end portion 330A (e.g., the first end portion 230A), which is open, of the housing 330.

The housing 330 may include a susceptor 332 (e.g., the susceptor 232) positioned in the second enclosure 331B, a heater 334 (e.g., the heater 234) positioned between the first enclosure 331A and the second enclosure 331B, and a sensor 336 (e.g., the sensor 236) positioned in the second enclosure 331B so as not to substantially overlap the susceptor 332.

In an example embodiment, the susceptor 332 may have a structure that accommodates at least a portion of an aerosol generating article 301 (e.g., the aerosol generating article 201). For example, the susceptor 332 may include a first opening 332A, a second opening 332B positioned opposite to the first opening 332A, and a side wall 332C defining the first opening 332A and the second opening 332B and forming a hollow portion between the first opening 332A and the second opening 332B. In some example embodiments, the susceptor 332 may include a first flange F1 between the first opening 332A and the side wall 332C, and/or a second flange F2 between the second opening 332B and the side wall 332C.

In an example embodiment, the sensor 336 may include an electrode having a side surface 336A that extends in a circumferential direction. In some example embodiments, the side surface 336A of the electrode may extend about 360 degrees to form a substantially circular ring structure. In an example embodiment, the sensor 336 may include a first electrical wire 336B and a second electrical wire 336C each connected to the side surface 336A.

In an example embodiment, the housing 330 may include a support body 338 configured to support the susceptor 332 and/or the aerosol generating article 301. For example, the support body 338 may include a first body surface 338A, a second body surface 338B opposite to the first body surface 338A and positioned on a bottom surface of the second enclosure 331B, a side body surface 338C positioned between the first body surface 338A and the second body surface 338B and facing a side surface of the second enclosure 331B, a first recess 338D formed on the first body surface 338A to support at least a portion (e.g., the second flange F2) of the susceptor 332, and a second recess 338E formed in the first recess 338D to support at least a portion (e.g., the first segment 201A) of the aerosol generating article 301.

In some example embodiments, the support body 338 may include a third recess 338F formed in the second recess 338E to form an airflow space with at least a portion (e.g., the first segment 201A) of the aerosol generating article 301. An airflow in the airflow space may be introduced into the aerosol generating article 301 and travel along the longitudinal direction of the aerosol generating article 301 (e.g., sequentially along the first segment 201A, the second segment 201B, and the third segment 201C).

In an example embodiment, the housing 330 may include a ground portion 339 electrically connected to the sensor 336. The ground portion 339 may include a ground plate 339A coupled to one surface (e.g., a lower surface) of the second enclosure 331B positioned on the second end portion 330B of the housing 330, and an electrical wire 339B connected to the ground plate 339A and another component (e.g., the first housing 210 of FIGS. 2 and 3). The ground portion 339 may remove noise that may be generated by the sensor 336, thereby improving the recognition rate of the sensor 336 of detecting the aerosol generating article 301.

FIGS. 9 and 10 are perspective views of a sensor to be included in an aerosol generating device according to example embodiments. FIGS. 11 through 13 are diagrams illustrating examples of an aerosol generating article inserted into an aerosol generating device according to example embodiments.

Referring to FIG. 9. a sensor 436 (e.g., the sensor 336) may include an electrode having a substantially semi-circular ring structure. At least a portion of an aerosol generating article (e.g., the aerosol generating article 201) may be positioned inside a side surface of the semi-circular ring structure.

Referring to FIG. 10. a sensor 536 (e.g., the sensor 336) may include an electrode having a substantially quarter-circular ring structure. At least a portion of an aerosol generating article (e.g., the aerosol generating article 201) may be positioned inside a side surface of the quarter-circular ring structure.

Referring to FIG. 11, an aerosol generating device 1 may include a battery 11, a controller 12, and a heater 13. Referring to FIGS. 12 and 13, the aerosol generating device 1 may further include a vaporizer 14. In addition, an aerosol generating article 2 (e.g., a cigarette) may be inserted into an inner space of the aerosol generating device 1.

The aerosol generating device 1 shown in FIGS. 11 through 13 may include components related to an example embodiment described herein. Therefore, it is to be understood by one of ordinary skill in the art to which the disclosure pertains that the aerosol generating device 1 may further include other general-purpose components in addition to the ones shown in FIGS. 11 through 13.

In addition, although it is shown that the heater 13 is included in the aerosol generating device 1 in FIGS. 12 and 13, the heater 13 may be omitted in an embodiment.

FIG. 11 illustrates a linear alignment of the battery 11, the controller 12, and the heater 13. FIG. 12 illustrates a linear alignment of the battery 11, the controller 12, the vaporizer 14, and the heater 13. FIG. 13 illustrates a parallel alignment of the vaporizer 14 and the heater 13. However, the internal structure of the aerosol generating device 1 is not limited to what is shown in FIGS. 11 through 13. That is, the alignments of the battery 11, the controller 12, the heater 13, and the vaporizer 14 as shown in FIGS. 11-13 may be changed depending on the design of the aerosol generating device 1.

When the aerosol generating article 2 is inserted into the aerosol generating device 1, the aerosol generating device 1 may operate the heater 13 and/or the vaporizer 14 to generate an aerosol. The aerosol generated by the heater 13 and/or the vaporizer 14 may pass through the aerosol generating article 2 into the user.

In an embodiment, even when the aerosol generating article 2 is not inserted in the aerosol generating device 1, the aerosol generating device 1 may control the heater 13 to operate a heating operation, in an embodiment.

The battery 11 may supply power to be used to operate the aerosol generating device 1. For example, the battery 11 may supply power to heat the heater 13 or the vaporizer 14, and may supply power required for the controller 12 to operate. In addition, the battery 11 may supply power required to operate a display, a sensor, a motor, or the like included in the aerosol generating device 1.

The controller 12 may control the overall operation of the aerosol generating device 1. In an embodiment, the controller 12 may control respective operations of other components included in the aerosol generating device 1, in addition to the battery 11, the heater 13, and the vaporizer 14. In addition, the controller 12 may verify a state of each of the components of the aerosol generating device 1 to determine whether the aerosol generating device 1 is in an operable state.

The controller 12 may include at least one processor. The at least one processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the at least one processor may be implemented in other types of hardware.

The heater 13 may be heated by power supplied by the battery 11. For example, when a cigarette is inserted in the aerosol generating device 1, the heater 13 may be disposed outside the cigarette. The heated heater 13 may thus raise the temperature of an aerosol generating material in the cigarette.

The heater 13 may be an electrically resistive heater. For example, the heater 13 may include an electrically conductive track, and the heater 13 may be heated as a current flows through the electrically conductive track. However, the heater 13 is not limited to the foregoing example, and any example of heating the heater 13 up to a desired temperature may be applicable without limitation. Here, the desired temperature may be preset in the aerosol generating device 1 or may be set by the user.

As another example, the heater 13 may be an induction heater. In an embodiment, the heater 13 may include an electrically conductive coil configured to heat the cigarette in an induction heating manner, and the cigarette may include a susceptor to be heated by the induction heater.

For example, the heater 13 may include a tubular heating element, a plate-shaped heating element, a needle-shaped heating element, or a rod-shaped heating element, and may heat the inside or outside of the aerosol generating article 2 according to the shape of a heating element.

In addition, the heater 13 may be provided as a plurality of heaters in the aerosol generating device 1. In this case, the plurality of heaters 13 may be disposed to be inserted into the aerosol generating article 2 or may be disposed outside the aerosol generating article 2. In addition, some of the plurality of heaters 13 may be disposed to be inserted into the aerosol generating article 2, and the rest may be disposed outside the aerosol generating article 2. However, the shape of the heater 13 is not limited to what is shown in FIGS. 11 through 13 but may be provided in various shapes.

The vaporizer 14 may heat a liquid composition to generate an aerosol, and the generated aerosol may pass through the aerosol generating article 2 into the user. That is, the aerosol generated by the vaporizer 14 may travel along an airflow path of the aerosol generating device 1, and the airflow path may be configured such that the aerosol generated by the vaporizer 14 may pass through the cigarette into the user.

For example, the vaporizer 14 may include a liquid storage, a liquid transfer means, and a heating element. However, example embodiments are not limited thereto. For example, the liquid storage, the liquid transfer means, and the heating element may be included as independent modules in the aerosol generating device 1.

The liquid storage may store the liquid composition. For example, the liquid composition may be a liquid including a tobacco-containing material having a volatile tobacco flavor ingredient, or a liquid including a non-tobacco material. The liquid storage may be manufactured to be detachable and attachable from and to the vaporizer 14, or may be manufactured in an integral form with the vaporizer 14.

The liquid composition may include, for example, water, a solvent, ethanol, a plant extract, a fragrance, a flavoring agent, or a vitamin mixture. The fragrance may include, for example, menthol, peppermint, spearmint oil, various fruit flavor ingredients, and the like. However, example embodiments are not limited thereto. The flavoring agent may include ingredients that provide the user with a variety of flavors or scents. The vitamin mixture may be a mixture of at least one of vitamin A, vitamin B, vitamin C, or vitamin E. However, example embodiments are not limited thereto. The liquid composition may also include an aerosol former such as glycerin and propylene glycol.

The liquid transfer means may transfer the liquid composition in the liquid storage to the heating element. The liquid transfer means may be, for example, a wick such as cotton fiber, ceramic fiber, glass fiber, or porous ceramic. However, example embodiments are not limited thereto.

The heating element may be an element configured to heat the liquid composition transferred by the liquid transfer means. The heating element may be, for example, a metal heating wire, a metal heating plate, a ceramic heater, or the like. However, example embodiments are not limited thereto. In addition, the heating element may include a conductive filament such as a nichrome wire, and may be arranged in a structure wound around the liquid transfer means. The heating element may be heated as a current is supplied and may transfer heat to the liquid composition in contact with the heating element, and may thereby heat the liquid composition. As a result, an aerosol may be generated.

For example, the vaporizer 14 may also be referred to as a cartomizer or an atomizer. However, example embodiments are not limited thereto.

The aerosol generating device 1 may further include general-purpose components in addition to the battery 11, the controller 12, the heater 13, and the vaporizer 14. For example, the aerosol generating device 1 may include a display that outputs visual information and/or a motor that outputs tactile information. In addition, the aerosol generating device 1 may include at least one sensor (e.g., a puff sensor, a temperature sensor, a cigarette insertion detection sensor, etc.). In addition, the aerosol generating device 1 may be manufactured to have a structure allowing external air to be introduced or internal gas to flow out even while the aerosol generating article 2 is inserted.

Although not shown in FIGS. 11 through 13, the aerosol generating device 1 may constitute a system along with a separate cradle. For example, the cradle may be used to charge the battery 11 of the aerosol generating device 1. Alternatively, the cradle may be used to heat the heater 13, with the cradle and the aerosol generating device 1 coupled.

The aerosol generating article 2 may be similar to a conventional combustible cigarette. For example, the aerosol generating article 2 may be divided into a first portion including an aerosol generating material and a second portion including a filter or the like. Alternatively, the second portion of the aerosol generating article 2 may also include the aerosol generating material. For example, the aerosol generating material provided in the form of granules or capsules may be inserted into the second portion.

The first portion may be entirely inserted into the aerosol generating device 1, and the second portion may be exposed outside. Alternatively, only the first portion may be partially inserted into the aerosol generating device 1, or the first portion may be entirely into the aerosol generating device 1 and the second portion may be partially inserted into the aerosol generating device 1. The user may inhale the aerosol with the second portion in their mouth. In this case, the aerosol may be generated as external air passes through the first portion, and the generated aerosol may pass through the second portion into the mouth of the user.

For example, the external air may be introduced through at least one air path formed in the aerosol generating device 1. In this example, the opening or closing and/or the size of the air path formed in the aerosol generating device 1 may be adjusted by the user. Accordingly, an amount of atomization, a sense of smoking, or the like may be adjusted by the user. As another example, the external air may be introduced into the inside of the aerosol generating article 2 through at least one hole formed on a surface of the aerosol generating article 2.

FIGS. 14 and 15 are diagrams illustrating examples of an aerosol generating article according to example embodiments.

Referring to FIG. 14, the aerosol generating article 2 may include a tobacco rod 21 and a filter rod 22. The first portion and the second portion described above with reference to FIGS. 11 through 13 may include the tobacco rod 21 and the filter rod 22, respectively.

The filter rod 22 is illustrated as having a single segment in FIG. 14. However, example embodiments are not limited thereto. That is, alternatively, the filter rod 22 may include a plurality of segments. For example, the filter rod 22 may include a segment that cools an aerosol and a segment that filters a predetermined ingredient contained in an aerosol. In addition, the filter rod 22 may further include at least one segment that performs another function, in an embodiment.

The diameter of the aerosol generating article 2 may be in a range of about 5 mm to about 9 mm, and the length thereof may be about 48 mm. However, example embodiments are not limited thereto. For example, the length of the tobacco rod 21 may be about 12 mm, the length of a first segment of the filter rod 22 may be about 10 mm, the length of a second segment of the filter rod 22 may be about 14 mm, and the length of a third segment of the filter rod 22 may be about 12 mm. However, example embodiments are not limited thereto.

The aerosol generating article 2 may be wrapped with at least one wrapper 24. The wrapper 24 may have at least one hole through which external air is introduced or internal gas flows out. As an example, the aerosol generating article 2 may be wrapped with one wrapper 24. As another example, the aerosol generating article 2 may be wrapped with two or more wrappers 24 in an overlapping manner. For example, the tobacco rod 21 may be wrapped with a first wrapper 24*a*, and the filter rod 22 may be wrapped with wrappers 24*b*, 24*c*, and 24*d*. In addition, the aerosol generating article 2 may be entirely wrapped again with a single wrapper 24*e*. For example, when the filter rod 22 includes a plurality of segments, the plurality of segments may be wrapped with the wrappers 24*b*, 24*c*, and 24*d*, respectively.

The first wrapper 24*a* and the second wrapper 24*b* may be formed of general filter wrapping paper. For example, the first wrapper 24*a* and the second wrapper 24*b* may be porous wrapping paper or non-porous wrapping paper. In addition, the first wrapper 24*a* and the second wrapper 24*b* may be formed of oilproof paper and/or an aluminum laminated wrapping material.

The third wrapper 24*c* may be formed of hard wrapping paper. For example, the basis weight of the third wrapper 24*c* may be in a range of about 88 $g/m^2$ to about 96 $g/m^2$, and may be desirably in a range of about 90 $g/m^2$ to about 94 $g/m^2$. In addition, the thickness of the third wrapper 24*c* may be in a range of about 120 μm to about 130 μm, and may be desirably about 125 μm.

The fourth wrapper 24*d* may be formed of oilproof hard wrapping paper. For example, the basis weight of the fourth wrapper 24*d* may be in a range of about 88 $g/m^2$ to about 96 $g/m^2$, and may be desirably in a range of about 90 $g/m^2$ to about 94 $g/m^2$. In addition, the thickness of the fourth wrapper 24*d* may be in a range of about 120 μm to about 130 μm, and may be desirably about 125 μm.

The fifth wrapper 24*e* may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 24*e* may be in a range of about 57 $g/m^2$ to about 63 $g/m^2$, and may be desirably about 60 $g/m^2$. In addition, the thickness of the fifth wrapper 24*e* may be in a range of about 64 μm to about 70 μm, and may be desirably about 67 μm.

The fifth wrapper 24*e* may have a predetermined material internally added thereto. The material may be, for example, silicon. However, example embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied to (or used to coat) the fifth wrapper 24*e* without limitation.

The fifth wrapper 24*e* may prevent the aerosol generating article 2 from burning. For example, there may be a probability that the aerosol generating article 2 burns when the tobacco rod 21 is heated by the heater 13. In an embodiment, when the temperature rises above the ignition point of any one of the materials included in the tobacco rod 21, the aerosol generating article 2 may burn. Even in this case, it may still be possible to prevent the aerosol generating article 2 from burning because the fifth wrapper 24*e* includes a non-combustible material.

In addition, the fifth wrapper 24*e* may prevent a holder from being contaminated by substances produced in the aerosol generating article 2. For example, liquid substances may be produced in the aerosol generating article 2 when the user puffs. For example, as an aerosol generated in the aerosol generating article 2 is cooled by external air, liquid substances (e.g., moisture, etc.) may be produced. As the aerosol generating article 2 is wrapped with the fifth wrapper 24*e*, the liquid substances generated within the aerosol generating article 2 may be prevented from leaking out of the aerosol generating article 2.

The tobacco rod 21 may include an aerosol generating material. The aerosol generating material may include, for example, at least one of glycerin, propylene glycol, ethylene glycol, dipropylene glycol, diethylene glycol, triethylene glycol, tetraethylene glycol, or oleyl alcohol. However, example embodiments are not limited thereto. The tobacco rod 21 may also include other additives such as, for example, a flavoring agent, a wetting agent, and/or an organic acid. In addition, the tobacco rod 21 may include a flavoring liquid such as menthol or a moisturizing agent that is added as being sprayed onto the tobacco rod 21.

The tobacco rod 21 may be manufactured in various forms. For example, the tobacco rod 21 may be formed as a sheet or a strand. Alternatively, the tobacco rod 21 may be formed of tobacco leaves finely cut from a tobacco sheet. In addition, the tobacco rod 21 may be enveloped by a thermally conductive material. The thermally conductive material may be, for example, a metal foil such as aluminum foil. However, example embodiments are not limited thereto. For example, the thermally conductive material enveloping the tobacco rod 21 may evenly distribute the heat transferred to the tobacco rod 21 to improve the conductivity of the heat to be applied to the tobacco rod 21, thereby improving the taste of tobacco. In addition, the thermally conductive material enveloping the tobacco rod 21 may function as a susceptor heated by an induction heater. In this case, although not shown, the tobacco rod 21 may further include an additional susceptor in addition to the thermally conductive material enveloping the outside thereof.

The filter rod 22 may be a cellulose acetate filter. However, there is no limit to the shape of the filter rod 22. For example, the filter rod 22 may be a cylindrical rod, or a tubular rod including a hollow therein. The filter rod 22 may also be a recess-type rod. For example, when the filter rod 22 includes a plurality of segments, at least one of the segments may be manufactured in a different shape.

A first segment of the filter rod 22 may be a cellulose acetate filter. For example, the first segment may be a tubular structure including a hollow therein. The first segment may prevent internal materials of the tobacco rod 21 from being pushed back when the heater 13 is inserted into the tobacco rod 21 and may cool the aerosol. A desirable diameter of the hollow included in the first segment may be adopted from a range of about 2 mm to about 4.5 mm. However, example embodiments are not limited thereto.

A desirable length of the first segment may be adopted from a range of about 4 mm to about 30 mm. However, example embodiments are not limited thereto. Desirably, the length of the second segment may be 10 mm. However, example embodiments are not limited thereto.

The first segment may have a hardness that is adjustable through an adjustment of the content of a plasticizer in the process of manufacturing the first segment. In addition, the first segment may be manufactured by inserting a structure such as a film or a tube of the same or different materials therein (e.g., in the hollow).

A second segment of the filter rod 22 may cool an aerosol generated as the heater 13 heats the tobacco rod 21. The user may thus inhale the aerosol cooled down to a suitable temperature.

The length or diameter of the second segment may be determined in various ways according to the shape of the aerosol generating article 2. For example, a desirable length of the second segment may be adopted from a range of about 7 mm to about 20 mm. Desirably, the length of the second segment may be about 14 mm. However, example embodiments are not limited thereto.

The second segment may be manufactured by weaving a polymer fiber. In this case, a flavoring liquid may be applied to a fiber formed of a polymer. As another example, the second segment may be manufactured by weaving a separate fiber to which a flavoring liquid is applied and the fiber formed of the polymer together. As still another example, the second segment may be formed with a crimped polymer sheet.

For example, the polymer may be prepared with a material selected from the group consisting of polyethylene (PE), polypropylene (PP), polyvinyl chloride (PVC), polyethylene terephthalate (PET), polylactic acid (PLA), cellulose acetate (CA,) and aluminum foil.

As the second segment is formed with the woven polymer fiber or the crimped polymer sheet, the second segment may include a single channel or a plurality of channels extending in a longitudinal direction. A channel used herein may refer to a path through which a gas (e.g., air or aerosol) passes.

For example, the second segment formed with the crimped polymer sheet may be formed of a material having a thickness between about 5 μm and about 300 μm, for example, between about 10 μm and about 250 μm. In addition, the total surface area of the second segment may be between about 300 $mm^2/mm$ and about 1000 $mm^2/mm$. Further, an aerosol cooling element may be formed from a material having a specific surface area between about 10 $mm^2/mg$ and about 100 $mm^2/mg$.

The second segment may include a thread containing a volatile flavor ingredient. The volatile flavor ingredient may be menthol. However, example embodiments are not limited thereto. For example, the thread may be filled with a sufficient amount of menthol to provide at least 1.5 mg of menthol to the second segment.

A third segment of the filter rod 22 may be a cellulose acetate filter. A desirable length of the third segment may be adopted from a range of about 4 mm to about 20 mm. For example, the length of the third segment may be about 12 mm. However, example embodiments are not limited thereto.

The third segment may be manufactured such that a flavor is generated by spraying a flavoring liquid onto the third segment in the process of manufacturing the third segment. Alternatively, a separate fiber to which the flavoring liquid is applied may be inserted into the third segment. An aerosol generated in the tobacco rod 21 may be cooled as it passes through the second segment of the filter rod 22, and the cooled aerosol may pass through the third segment into the user. Accordingly, when a flavoring element is added to the third segment, the flavor carried to the user may last much longer.

In addition, the filter rod 22 may include at least one capsule 23. Here, the capsule 23 may perform a function of generating a flavor or a function of generating an aerosol. For example, the capsule 23 may have a structure in which a liquid containing a fragrance is wrapped with a film. The capsule 23 may have a spherical or cylindrical shape. However, example embodiments are not limited thereto.

Referring to FIG. 15, an aerosol generating article 3 may include a front end plug 33, a tobacco rod 31, and a filter rod 32. The front end plug 33 may be disposed on one side of the tobacco rod 31 opposite to the filter rod 32. The front end plug 33 may prevent the tobacco rod 31 from escaping to the outside, and may also prevent an aerosol liquefied in the tobacco rod 31 during smoking from flowing into an aerosol generating device (e.g., any one of the aerosol generating device 1 of FIGS. 11 through 13).

The filter rod 32 may include a first segment 32*a* and a second segment 32*b*. Here, the first segment 32*a* may correspond to the first segment of the filter rod 22 of FIG. 14, and the second segment 32*b* may correspond to the third segment of the filter rod 22 of FIG. 14.

The diameter and the total length of the aerosol generating article 3 may correspond to the diameter and the total length of the aerosol generating article 2 of FIG. 14. For example, the length of the front end plug 33 may be about 7 mm, the length of the tobacco rod 31 may be about 15 mm, the length of the first segment 32*a* may be about 12 mm, and the length of the second segment 32*b* may be about 14 mm. However, example embodiments are not limited thereto.

The aerosol generating article 3 may be wrapped by at least one wrapper 35. The wrapper 35 may have at least one hole through which external air is introduced or internal gas flows out. For example, the front end plug 33 may be wrapped with a first wrapper 35*a*, the tobacco rod 31 may be wrapped with a second wrapper 35*b*, the first segment 32*a* may be wrapped with a third wrapper 35*c*, and the second segment 32*b* may be wrapped with a fourth wrapper 35*d*. In addition, the aerosol generating article 3 may be entirely wrapped again with a fifth wrapper 35*e*.

In addition, at least one perforation 36 may be formed in the fifth wrapper 35*e*. For example, the perforation 36 may be formed in an area surrounding the tobacco rod 31. However, example embodiments are not limited thereto. The perforation 36 may perform a function of transferring heat generated by the heater 13 shown in FIGS. 12 and 13 to the inside of the tobacco rod 31.

In addition, the second segment 32*b* may include at least one capsule 34. Here, the capsule 34 may perform a function of generating a flavor or a function of generating an aerosol. For example, the capsule 34 may have a structure in which a liquid containing a fragrance is wrapped with a film. The capsule 34 may have a spherical or cylindrical shape. However, example embodiments are not limited thereto.

The first wrapper 35*a* may be a combination of general filter wrapping paper and a metal foil such as aluminum foil. For example, the total thickness of the first wrapper 35*a* may be in a range of about 45 μm to about 55 μm, and may be desirably about 50.3 μm. Further, the thickness of the metal foil of the first wrapper 35*a* may be in a range of about 6 μm to about 7 μm, and may be desirably about 6.3 μm. In addition, the basis weight of the first wrapper 35*a* may be in a range of about 50 $g/m^2$ to about 55 $g/m^2$, and may be desirably about 53 $g/m^2$.

The second wrapper 35*b* and the third wrapper 35*c* may be formed with general filter wrapping paper. For example, the second wrapper 35*b* and the third wrapper 35*c* may be porous wrapping paper or non-porous wrapping paper.

For example, the porosity of the second wrapper 35*b* may be 35000 CU. However, example embodiments are not limited thereto. Further, the thickness of the second wrapper 35*b* may be in a range of about 70 μm to about 80 μm, and may be desirably about 78 μm. In addition, the basis weight of the second wrapper 35*b* may be in a range of about 20 $g/m^2$ to about 25 $g/m^2$, and may be desirably about 23.5 $g/m^2$.

For example, the porosity of the third wrapper 35*c* may be 24000 CU. However, example embodiments are not limited thereto. Further, the thickness of the third wrapper 35*c* may be in a range of about 60 μm to about 70 μm, and may be desirably about 68 μm. In addition, the basis weight of the third wrapper 35*c* may be in a range of about 20 $g/m^2$ to about 25 $g/m^2$, and may be desirably about 21 $g/m^2$.

The fourth wrapper 35*d* may be formed with polylactic acid (PLA) laminated paper. Here, the PLA laminated paper may refer to three-ply paper including a paper layer, a PLA layer, and a paper layer. For example, the thickness of the fourth wrapper 35*d* may be in a range of about 100 μm to about 120 μm, and may be desirably about 110 μm. In addition, the basis weight of the fourth wrapper 35*d* may be in a range of about 80 $g/m^2$ to about 100 $g/m^2$, and may be desirably about 88 $g/m^2$.

The fifth wrapper 35*e* may be formed of sterile paper (e.g., MFW). Here, the sterile paper (MFW) may refer to paper specially prepared such that it has enhanced tensile strength, water resistance, smoothness, or the like, compared to general paper. For example, the basis weight of the fifth wrapper 35*e* may be in a range of about 57 $g/m^2$ to about 63 $g/m^2$, and may be desirably about 60 $g/m^2$. Further, the thickness of the fifth wrapper 35*e* may be in a range of about 64 μm to about 70 μm, and may be desirably about 67 μm.

The fifth wrapper 35*e* may have a predetermined material internally added thereto. The material may be, for example, silicon. However, example embodiments are not limited thereto. Silicon may have properties, such as, for example, heat resistance which is characterized by less change by temperature, oxidation resistance which refers to resistance to oxidation, resistance to various chemicals, water repellency against water, or electrical insulation. However, silicon may not be necessarily used, but any material having such properties described above may be applied to (or used to coat) the fifth wrapper 35*e* without limitation.

The front end plug 33 may be formed of cellulose acetate. For example, the front end plug 33 may be manufactured by adding a plasticizer (e.g., triacetin) to cellulose acetate tow. The mono denier of a filament of the cellulose acetate tow may be in a range of about 1.0 to about 10.0, and may be desirably in a range of about 4.0 to about 6.0. The mono denier of the filament of the front end plug 33 may be more desirably about 5.0. In addition, a cross section of the filament of the front end plug 33 may be Y-shaped. The total denier of the front end plug 33 may be in a range of about 20000 to about 30000, and may be desirably in a range of about 25000 to about 30000. The total denier of the front end plug 33 may be more desirably 28000.

In addition, in an embodiment, the front end plug 33 may include at least one channel, and a cross section of the channel may be provided in various shapes.

The tobacco rod 31 may correspond to the tobacco rod 21 described above with reference to FIG. 14. Thus, a detailed description of the tobacco rod 31 will be omitted here.

The first segment 32*a* may be formed of cellulose acetate. For example, the first segment may be a tubular structure including a hollow therein. The first segment 32*a* may be manufactured by adding a plasticizer (e.g., triacetin) to cellulose acetate tow. For example, the mono denier and the total denier of the first segment 32*a* may be the same as the mono denier and the total denier of the front end plug 33.

The second segment 32*b* may be formed of cellulose acetate. The mono denier of a filament of the second segment 32*b* may be in a range of about 1.0 to about 10.0, and may be desirably in a range of about 8.0 to about 10.0. The mono denier of the filament of the second segment 32*b* may be more desirably 9.0. In addition, a cross section of the filament of the second segment 32*b* may be Y-shaped. The total denier of the second segment 32*b* may be in a range of about 20000 to about 30000, and may be desirably 25000.

One example embodiment may also be implemented in the form of a recording medium including instructions executable by a computer, such as a program module executable by the computer. A computer-readable medium may be any available medium that can be accessed by a computer and includes a volatile medium, a non-volatile medium, a removable medium, and a non-removable medium. In addition, the computer-readable medium may include both a computer storage medium and a communication medium. The computer storage medium includes all of a volatile medium, a non-volatile medium, a removable medium, and a non-removable medium implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer medium.

The descriptions of the above-described example embodiments are merely examples, and it will be understood by one of ordinary skill in the art that various changes and equivalents may be made thereto. Therefore, the scope of the disclosure should be defined by the appended claims and their equivalents, and all differences within the scope equivalent to those described in the claims will be construed as being included in the scope of protection defined by the claims and their equivalents.

The features and aspects of any example embodiment(s) described above may be combined with features and aspects of any other example embodiment(s).

The invention claimed is:

1. An aerosol generating device, comprising:

a susceptor configured to accommodate at least a portion of an aerosol generating article;

a sensor configured to sense the aerosol generating article and positioned such that the sensor does not overlap the susceptor; and a housing, wherein the housing comprises:

a first end portion, which is open;

a second end portion, which is closed and opposite to the first end portion; and a side portion between the first end portion and the second end portion, wherein the susceptor is positioned adjacent to the first end portion, and the sensor is positioned adjacent to the second end portion, and wherein the sensor comprises an electrode having a side surface, the side surface extending in a circumferential direction.

2. The aerosol generating device of claim 1, wherein the electrode has a substantially circular ring structure.

3. The aerosol generating device of claim 1, wherein the electrode has a substantially semi-circular ring structure.

4. The aerosol generating device of claim 1, wherein the electrode has a substantially quarter-circular ring structure.

5. The aerosol generating device of claim 1, further comprising:

a ground portion electrically connected to the sensor.

6. The aerosol generating device of claim 5, wherein the ground portion is positioned on the second end portion of the housing.

7. The aerosol generating device of claim 1, wherein the aerosol generating device further comprises a support body positioned on the second end portion of the housing, the support body being configured to support the aerosol generating article and the susceptor, wherein the sensor is embedded in the support body.

8. The aerosol generating device of claim 1, wherein the susceptor comprises:

a first opening facing the first end portion;

a second opening facing the second end portion; and a side wall that provides the first opening and the second opening and positioned between the first opening and the second opening.

9. An aerosol generating system, comprising:

an aerosol generating article; and an aerosol generating device configured to generate an aerosol from the aerosol generating article, wherein the aerosol generating device comprises:

a susceptor configured to accommodate at least a portion of the aerosol generating article; and a sensor configured to sense the aerosol generating article and positioned such that the sensor does not overlap the susceptor; and a housing, wherein the housing comprises:

a first end portion, which is open;

a second end portion, which is closed and opposite to the first end portion; and a side portion between the first end portion and the second end portion, wherein the susceptor is positioned adjacent to the first end portion, and the sensor is positioned adjacent to the second end portion, and the sensor comprises an electrode having a side surface, the side surface extending in a circumferential direction.

10. The aerosol generating system of claim 9, wherein the aerosol generating device further comprises a ground portion electrically connected to the sensor.

11. The aerosol generating system of claim 9, wherein the aerosol generating article comprises a first segment comprising a moisturizing agent, a second segment comprising a tobacco medium, and a third segment comprising a filter.

* * * * *